G. W. COMBS.
GYRATORY STRUCTURE.
APPLICATION FILED APR. 13, 1908.
1,123,168.
Patented Dec. 29, 1914.
4 SHEETS—SHEET 1.
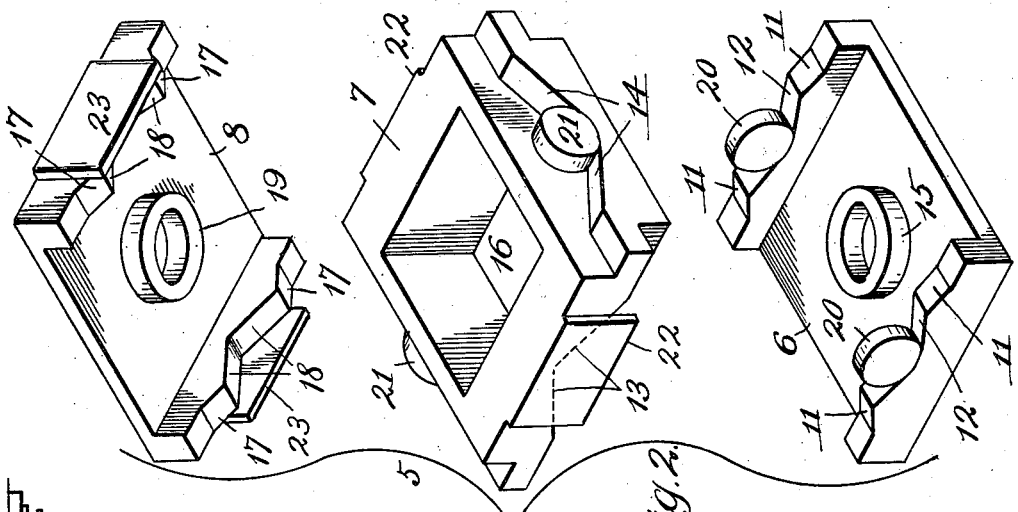
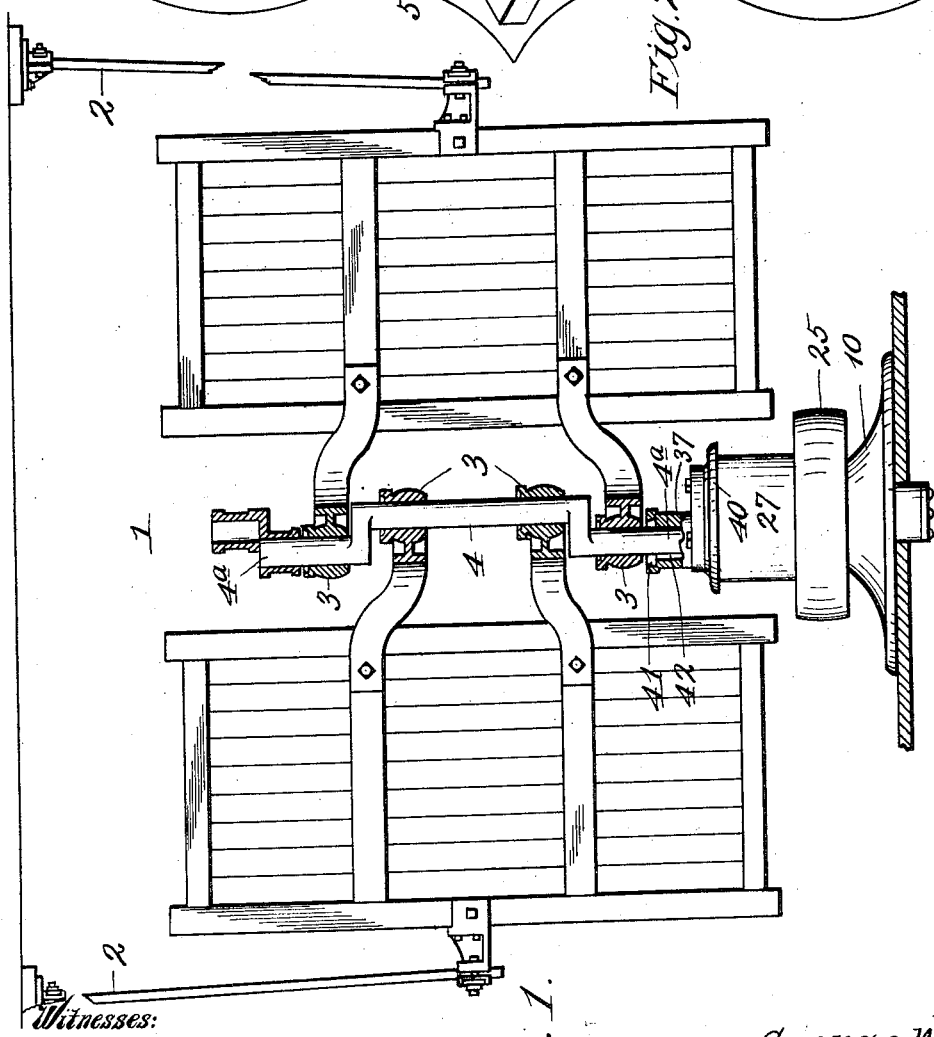
Witnesses:
R. Hamilton
E. A. Cahill
Inventor,
George W. Combs
By F. G. Fischer, Atty.

G. W. COMBS.
GYRATORY STRUCTURE.
APPLICATION FILED APR. 13, 1908.
1,123,168.
Patented Dec. 29, 1914.
4 SHEETS—SHEET 2.
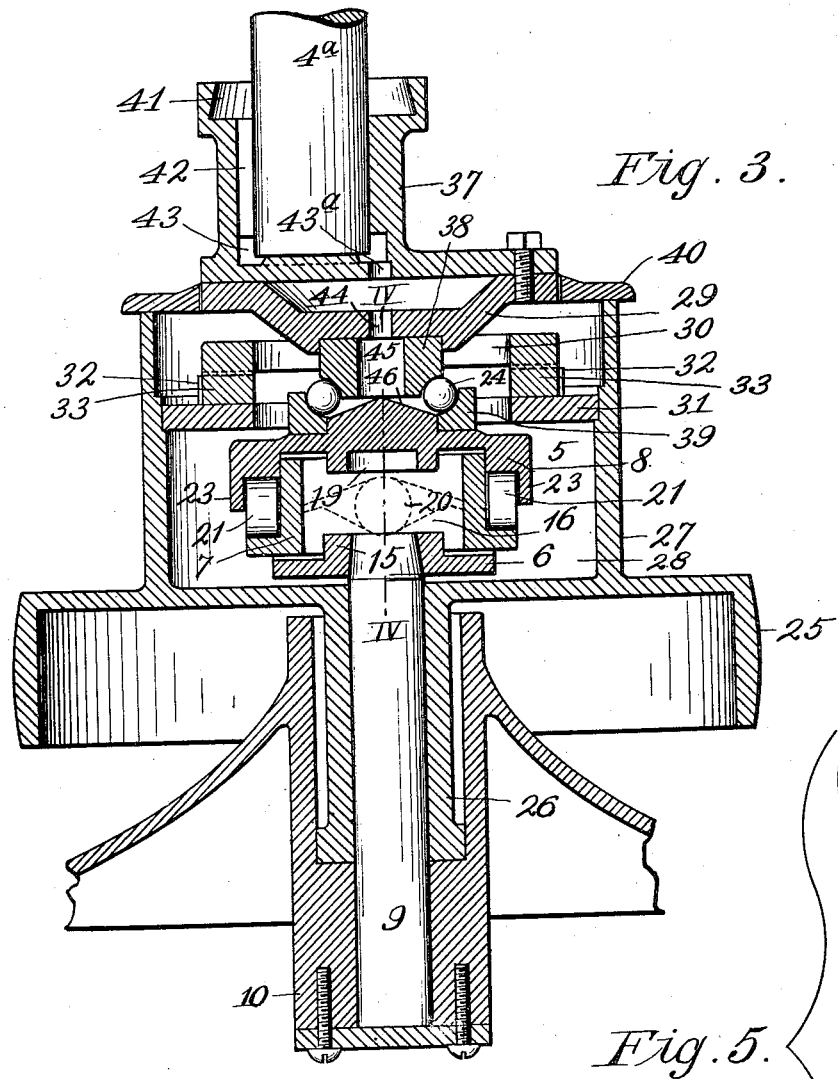
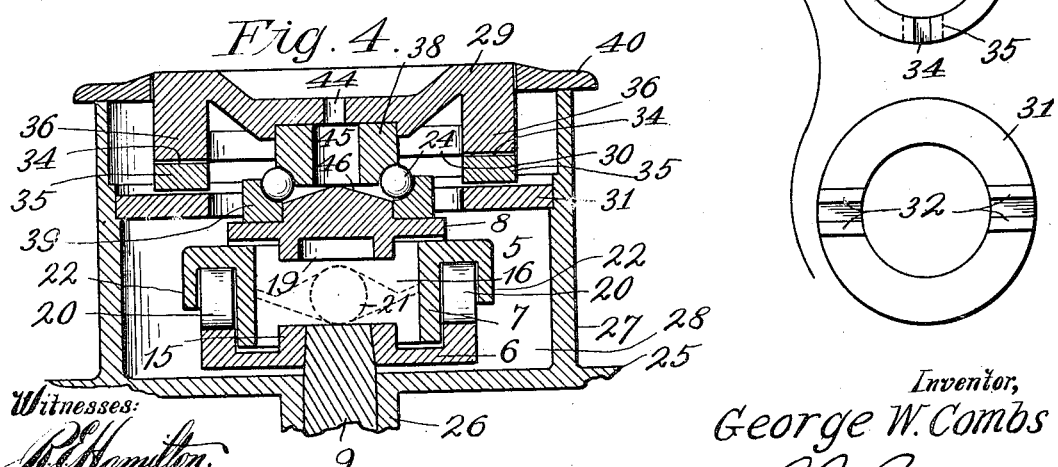
Witnesses:
R. E. Hamilton.
E. A. Cahill.
Inventor,
George W. Combs
By F. G. Fischer, Atty.

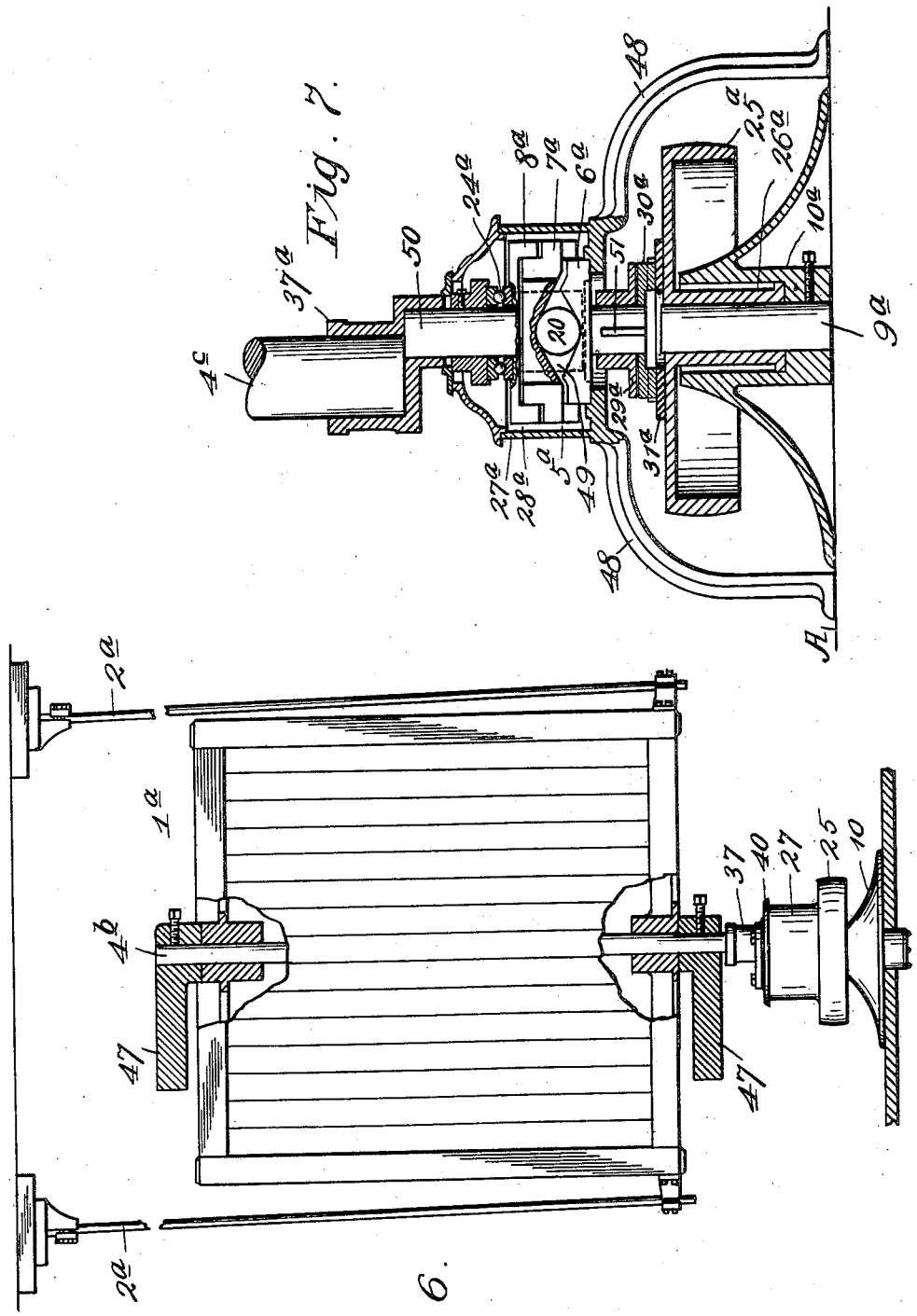

G. W. COMBS.
GYRATORY STRUCTURE.
APPLICATION FILED APR. 13, 1908.
1,123,168.
Patented Dec. 29, 1914.
4 SHEETS—SHEET 4.
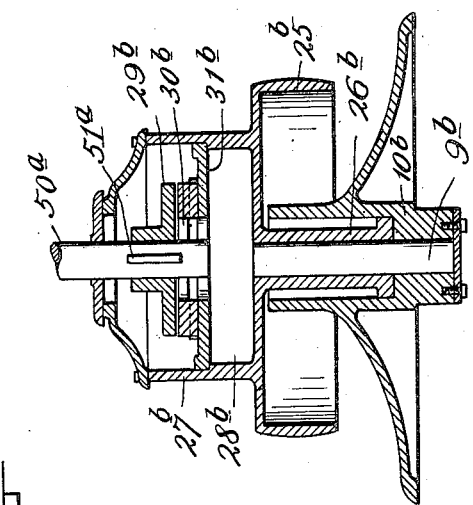
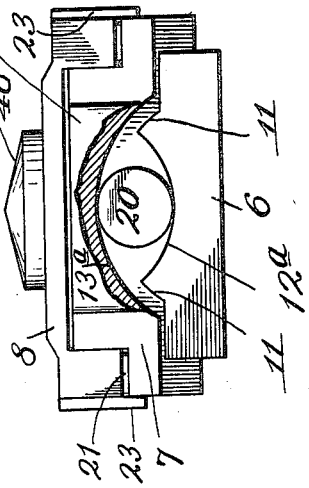
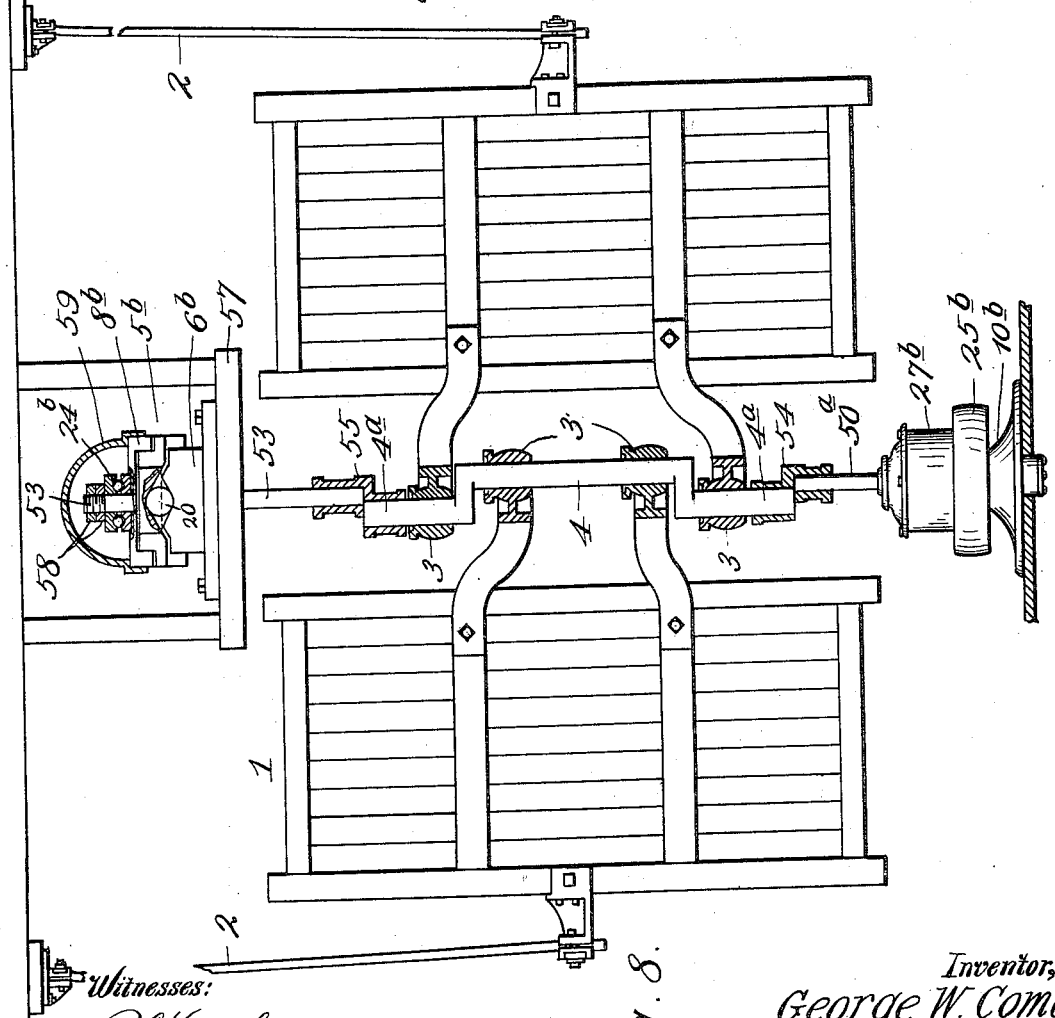
Inventor,
George W. Combs
By F. G. Fischer, Atty.
Witnesses:
R. E. Hamilton
E. A. Cahill

UNITED STATES PATENT OFFICE.

GEORGE W. COMBS, OF LEAVENWORTH, KANSAS.

GYRATORY STRUCTURE.

1,123,168.      Specification of Letters Patent.      Patented Dec. 29, 1914.

Application filed April 13, 1908. Serial No. 426,730.

*To all whom it may concern:*

Be it known that I, GEORGE W. COMBS, a citizen of the United States, residing at Leavenworth, in the county of Leavenworth and State of Kansas, have invented certain new and useful Improvements in Gyratory Structures, of which the following is a specification.

This invention relates to improvements in gyratory structures such as flour-sifters, etc.; and my object is to overcome excessive throw of the gyratory structure which is not only detrimental to the structure itself, but also to the building containing the same. This excessive throw in flour-sifters is generally caused by one of the sieve-boxes becoming overloaded with stock and overbalancing its companion, and when the sifter has a rigid connection with the building, as through its drive-shaft and a stationary bearing, considerable strain is imposed upon the building whenever the sifter leaves its true gyratory course.

I overcome excessive throw of the structure by providing novel means wherein the force of gravity acts on inclined ways, and I relieve the structure and the building of abnormal strain by yieldingly-connecting the shaft of said structure to the building.

In order that the invention may be fully understood, reference will now be made to the accompanying drawings, in which:

Figure 1 represents a vertical section of a gyratory structure provided with my improvements. Fig. 2 shows the several parts of the inclined way restraining means in perspective, ready to be assembled. Fig. 3 is a broken vertical section of the lower end of the drive-shaft, the inclined way restraining means, a driver, a step-bearing for the driver, and the yielding coupling between the driver and the shaft. Fig. 4 is a broken vertical section on line IV—IV of Fig. 3. Fig. 5 shows the several parts of the yielding coupling between the driver and the shaft, ready to be assembled. Fig. 6 is an elevation partly in section of a modified form of sieve-structure provided with my driving and restraining mechanisms. Fig. 7 is a vertical section of a modified form of my driving and restraining mechanisms. Fig. 8 is a vertical section of the sieve-structure provided with another modified form of driving and restraining mechanisms. Fig. 9 is a vertical section of the driving mechanism shown in Fig. 8. Fig. 10 is a side elevation partly in section of another modified form of restraining mechanism.

1 designates the sieve-structure, of any preferred type, which is suspended from above by flexible rods 2, and provided with centrally-disposed bearings 3, in which the vertical drive-shaft 4 is journaled and has slight longitudinal movement. Said drive-shaft is provided with cranks 4ª, to impart a gyratory motion to the structure, and it may be made in one piece, as shown in Fig. 1, or it may be made in two or more pieces, as shown in Figs. 7 and 8.

The inclined way restraining means for restricting abnormal throw of the structure consists, preferably, of a plural-piece member 5 embracing a bottom piece 6, an intermediate piece 7 movable upon the bottom piece, and a top piece 8 movable upon the intermediate piece. All of these pieces have inclined ways which normally hold pieces 7 and 8 in axial alinement with each other and with the stationary bottom piece 6. Bottom piece 6 is connected to an adjacent portion of the building, as through a stub-shaft 9 and a step-bearing 10, Fig. 3, or through the means shown in Figs. 7 and 8, or it may be secured to the building by any other suitable means. Said bottom piece is provided with parallel inclined ways 11 and parallel inclined ways 12. Inclined ways 12 are connected in pairs to form two V-shaped ways for the reception of a pair of antifriction rollers 20, hereinafter referred to. Intermediate piece 7 is provided with parallel inclined ways 13 and parallel inclined ways 14, which latter are disposed at right angles to the former. Inclined ways 13 are connected in pairs to form two inverted V-shaped ways adapted to travel to and fro upon the inclined ways 11, said travel being limited by a hub 15 extending upwardly from the bottom piece into the hollow portion 16 of the intermediate piece. Top piece 8 is provided with parallel inclined ways 17 and parallel inclined ways 18, the former of which are adapted to travel to and fro upon the inclined ways 14 of the intermediate piece. Inclined ways 18 are connected in pairs to form inverted V-shaped ways which travel upon a pair of antifriction rollers 21, hereinafter referred to, and the movement of the top piece is limited by an integral stop 19 depending into opening 16 in the intermediate piece 7.

By arranging the inclined ways 13 at right angles to the inclined ways 14 it is apparent that the movement of top piece 8 will be at right angles to the movement of the intermediate piece 7, and when these movements occur simultaneously the top piece will, by reason thereof, be permitted to gyrate with the shaft. It is also apparent that when the intermediate and top pieces travel to and fro they will be lifted by the inclined ways and raise shaft 4 and its weights, so that the weight of all of these parts acting on the inclined ways will tend to restore the intermediate piece 7 and the top piece 8 to their normal positions, and through them restrict abnormal throw of the shaft 4 and the structure. The gravity of weight of the pieces 7 and 8, together with the weight of the parts carried thereby, ordinarily, is sufficient to prevent them from moving too far, but as a matter of safety I provide the hub 15 and stop 19 for the purpose of positively checking the movements of said intermediate and top pieces.

To prevent undue wear of the plural-piece member 5, I interpose the antifriction rollers 20 between the V-shaped ways 12 and 13, and the rollers 21 between the V-shaped ways 14 and 18. Rollers 20 are held from lateral movement by the adjacent sides of the intermediate piece 7 and flanges 22, while rollers 21 are held from lateral movement by the adjacent sides of the intermediate piece and flanges 23, which latter depend from the adjacent sides of the top piece 8. Top piece 8 is prevented from rocking on rollers 21 by a ball-bearing 24, and the intermediate piece 7 is prevented from rocking by the manner in which the rollers 20 21 are disposed. Stub-shaft 9 is fixed at its lower end in step-bearing 10, and its upper end is fixed in hub 15 to prevent the plural-piece member 5 from rotating with drive-shaft 4. Said stub-shaft also forms the center of rotation around which the drive-shaft travels.

25 designates the driver which is journaled upon stub-shaft 9 and provided with a hub 26 which extends down into the step-bearing and is supported thereby. Said driver is independent of the plural-piece member 5 and has an upwardly-extending wall 27 forming a lubricant chamber 28 in which the plural-piece member 5 and the yielding coupling are located. Said yielding coupling consists of a top plate 29, an intermediate plate 30, and a bottom plate 31 and yieldingly connects the driver to shaft 4, so that the latter may gyrate while the driver rotates around the fixed axis in the form of the stub-shaft 9.

Bottom plate 31 is rigidly secured to wall 27 and provided with two pairs of oppositely-disposed upwardly-extending lugs 32, which are spaced apart to freely receive a pair of oppositely-disposed lugs 33 depending from the intermediate plate 30, which latter is movably mounted upon the bottom plate 31, the lugs 32 33 acting as guides therefor. The intermediate plate 30 has two grooves 34 in its upper portion, which are arranged at right angles to lugs 33 and the bottoms of which are closed by lugs 35 depending from the intermediate plate. The top plate 29, which is shown inverted in Fig. 5, is movable on the intermediate plate 30 and provided at its underside with a pair of oppositely-disposed lugs 36, which freely enter grooves 34 and guide the top plate while moving to and fro. By arranging lugs 36 at right-angles to lugs 32, top plate 29 will be permitted to move at right-angles to the intermediate plate 30, and when these plates move simultaneously, the top plate will be permitted to gyrate with the shaft to which it is connected through an eccentric hub 37. As it is desirable to have plates 29 and 30 operate with the least possible friction, so that no vibration will be transmitted from the gyratory structure to the building, I concave the top plate 29 so that it will rest upon the ball-bearing 24 which in turn is supported by the plural-piece member 5, as shown in Fig. 3. This arrangement relieves the coupling of the weight of shaft 4 and the parts carried thereby.

In order that the rotation of shaft 4 and the yielding coupling will be attended with but little friction, I secure the cone 38 of the ball-bearing, to the underside of the top plate 29, and the cup 39 of said ball-bearing to the upper surface of top piece 8 of the plural-piece member 5, plates 30 and 31 of the yielding coupling being made annular to allow said ball-bearing to extend therethrough. The upper end of the lubricant chamber is closed by the top plate 29 and a lid 40 which gyrate together, but the lid loosely embraces the top plate so that it will not be lifted from the chamber wall when said top plate moves upwardly with the top of the plural-piece member 5. Oil is supplied to the lower end of shaft 4 and to the eccentric hub 37 through an annular recess 41, which communicates with a duct 42, communicating at its lower end with an annular channel 43, all of which are arranged in hub 37. Channel 43 communicates, through an orifice 43ª, with the top plate 29, which has a duct 44 leading to a duct 45 in the cone 38, so that chamber 28 may be filled, or replenished with oil as occasion requires. Top piece 8 of the plural-piece member 5 has a conical boss 46 extending up through cup 39, and the apex of said boss is concentric with the duct 45, so that when the oil flowing through the latter falls upon the former it will be equally distributed thereby over the working surfaces of the ball-bearing.

The inclined way restraining mechanism and the yielding coupling disclosed by Fig. 6, are duplicates of those shown in Fig. 3, but the sieve-structure 1ª may consists of a single sieve-box or a pair of sieve-boxes rigidly connected together, so that they will operate as one unit. The shaft 4ᵇ, which drives the structure, is straight throughout its length, and in place of the cranks 4ª shown in Fig. 1, it is provided with a pair of eccentric weights 47, which, when the shaft is rotated, impart a gyratory motion to the structure 1ª, the same being suspended from the ceiling of the building by flexible rods 2ª.

Referring now to the modified form, Fig. 7, 9ª designates a stationary stub-shaft, which is fixed in the lower portion of a step-bearing 10ª secured to an adjacent portion of the building, as the floor A. 25ª designates a driver journaled upon the stub-shaft and provided with a hub 26ª, which extends down into said step-bearing and is supported thereby. The inclined way restraining means consists of a plural-piece member 5ª comprising a bottom piece 6ª, an intermediate piece 7ª, and a top piece 8ª, all of which are similar in form to the plural-piece member 5, except that the bottom piece 6ª is secured to the floor by a spider 48, instead of the stub-shaft 9, and the top piece is provided with a depending hub 49, in which is mounted an eccentric pin or extension 50 of the drive-shaft 4ᶜ, which is connected thereto by an eccentric hub 37ª. Pin 50 is supported by the plural-piece member 5ª, but in order to prevent friction between said pin and the top piece 8ª, I interpose a ball-bearing 24ª between the same. Pin 50 is connected to the driver 25ª by a yielding coupling consisting of a top plate 29ª, an intermediate plate 30ª, and a bottom plate 31ª. The construction and operation of this coupling is similar to that of the coupling disclosed by Fig. 5, except that the top plate is connected directly to the pin 50 by a feather 51 and the bottom plate is connected directly to the driver instead of wall 27ª. While the feather causes the top late 29ª to rotate with the pin 50, it permits the latter to move up and down with the top of the plural-piece member 5ª, so that the weight of the pin and the parts carried thereby will not rest upon the yielding coupling, but will be carried by the ball-bearing 24ª. Spider 48 is provided with an upwardly-extending wall 27ª forming a lubricant chamber 28ª, in which the plural-piece member 5ª and the ball-bearing 24ª are located. One advantage derived from the construction shown by Fig. 7 is that pin 50 extends through the hub 49 and thus overcomes all tendency of the top piece 8ª to rock upon the intermediate piece 7ª. A further advantage is that the plural-piece member 5ª and the yielding coupling are spaced some distance apart, so that access may be had to one without interfering with the other.

In the modified form, Fig. 8, the sieve-structure is a duplicate of that shown in Fig. 1, but the shaft is provided at its ends with extensions or pins 50ª 53, connected thereto by eccentric hubs 54 55, respectively, the former of which is connected to a driver 25ᵇ by a yielding coupling which is similar in construction to that shown by Fig. 5, and consists of a top plate 29ᵇ, an intermediate plate 30ᵇ, and a bottom plate 31ᵇ, which latter is secured to a wall 27ᵇ extending upwardly from the driver and forming a lubricant chamber 28ᵇ, see Fig. 9. Pin 50ª is slidable in the top plate 29ᵇ, so that it may move up and down with the inclined way restraining means, but in order that said pin may be rotated by the coupling and the driver, and thus rotate the drive-shaft 4, I provide it with a feather 51ª, which extends through a registering groove in the top plate 29ᵇ, in the well known manner. Driver 25ᵇ is journaled upon a stub-shaft 9ᵇ and has a hub 26ᵇ extending down into and supported by a step-bearing 10ᵇ. Pin 53 extends upwardly through and is supported by a plural-piece member 5ᵇ, similar in construction to the plural-piece member 5, disclosed by Fig. 2, with the exception that the bottom piece 6ᵇ is secured to a frame 57, depending from the ceiling of the building instead of being supported by the stub-shaft 9. A ball-bearing 24ᵇ is interposed between top piece 8ᵇ of the plural-piece member and the pin 53, which latter is provided with a pair of adjusting-nuts 58 at its upper end, so that the cranks 4ª of shaft 4 may be adjusted in proper relation to bearings 3, by adjusting said shaft up or down with the nuts. Ball-bearing 24ᵇ is protected from dust by a cap 59, resting upon the plural-piece member.

The modified form of the plural-piece member shown by Fig. 10 is a duplicate of the one disclosed by Fig. 2, except that the inclined ways 12ª, 13ª are curved instead of being V-shaped like the inclined ways 12 to 18, inclusive. The advantage derived from using the curved inclined ways resides in the fact that the restraining influence of the plural-piece member upon the drive-shaft increases in proportion to the lateral movement of pieces 7 and 8; whereas the resistance offered by the straight inclined ways, remains the same irrespective of the extent to which said pieces 7 and 8 move laterally.

From the above description it will be understood that I reserve the right to make the inclined ways either straight or curved. I also reserve the right to make such other changes in the details of construction and arrangement of parts as properly fall within the spirit and scope of the appended claims.

Having thus described my invention, what I claim is:—

1. In combination, a gyratory structure, a stationary support, and restraining means between the structure and the stationary support consisting of a plurality of inclined ways arranged at an angle to each other and tending to hold the structure from abnormal throw.

2. In combination, a gyratory structure, means for preventing rotation of said structure, a stationary support, and restraining means between the structure and the stationary support consisting of a plurality of inclined ways arranged at right angles to each other whereby abnormal throw of said structure is restricted.

3. In combination, a gyratory structure, means for freely supporting the same, and restraining means independent of said supporting means consisting of a plurality of inclined ways arranged at an angle to each other and tending to hold the structure from abnormal throw.

4. In combination, a gyratory structure, a vertically-positioned shaft thereto, a nongyratory driver surrounding the axis of movement and operably connected to the shaft, suspending means for the structure independent of the shaft, and a support for said shaft independent of the structure consisting of inclined way restraining means for restricting abnormal throw of the structure.

5. In combination, a gyratory structure consisting of one or more containers, a shaft arranged therein, a nongyratory driver operably connected to said shaft, a stationary bearing for said driver, and inclined way restraining means independent of the driver but connected to the shaft and tending to hold the structure in its true gyratory course.

6. In combination, a gyratory structure, inclined way restraining means operably connected to said structure and tending to hold the same in its true gyratory course, and a driver for the structure having a wall surrounding said restraining means.

7. In combination, a gyratory structure, a driver therefor, inclined way restraining means operably connected to said structure and tending to hold the same in its true gyratory course, a stub-shaft forming an axis for the driver and a support for the restraining means, and a bearing for supporting said stub-shaft.

8. In combination, a gyratory container, a shaft mounted therein, a driver surrounding the axis of movement, a support for the shaft independent of the container and the driver comprising inclined way restraining means whereby abnormal throw of the container is restricted, and ball-bearings between the shaft and said support.

9. In combination, a freely supported structure, a rotatable shaft mounted therein for imparting a gyratory motion thereto, a driver, yielding means connecting the shaft and said driver, and inclined way restraining means operably connected to the shaft and an adjacent portion of the building for overcoming abnormal throw of the structure.

10. In combination, a suspended body arranged to gyrate a driver therefor, inclined way restraining means for restricting excessive throw of the suspended body, and yielding means connecting said driver and the restraining means to the suspended body whereby the latter is permitted to gyrate.

11. In combination, a gyratory structure, a shaft therefor, a driver provided with a wall forming a lubricant chamber, inclined way restraining means in said chamber for restricting excessive throw of the structure, and a yielding connection also in said chamber for connecting the shaft and the driver.

12. In combination, a gyratory structure, a shaft therefor, a driver provided with a wall forming a lubricant chamber, inclined way restraining means in said chamber for restricting excessive throw of the structure, yielding means in the chamber connecting the driver and the restraining means to the shaft, said yielding means partially closing the top of the chamber, and a lid closing the remainder of the top of the chamber.

13. In combination, a suspended body, a shaft for imparting a gyratory motion thereto, said shaft being free to move vertically to a limited extent, and a plural-piece member including inclined ways tending to restrain the suspended body from abnormal gyration, a portion of said member being connected to the shaft to move the same vertically and gyrate therewith and another portion of said member being stationary.

14. In combination, a gyratory structure, a shaft for imparting a gyratory motion thereto, and a plural-piece member connected to said shaft and tending to overcome excessive throw of the structure, said plural-piece member consisting of a bottom piece having inclined ways, a top piece having inclined ways disposed at right angles to those on the bottom piece, and an intermediate piece having inclined ways at right angles to each other which movably engage those on the bottom and top pieces.

15. In combination, a gyratory structure, a shaft mounted therein for imparting a gyratory motion thereto, and a plural-piece member yieldingly connected to the shaft consisting of a top piece, an intermediate piece upon which the top piece travels to and fro, a stationary bottom piece upon which the intermediate piece travels to and fro in a direction at right angles to the travel of the top piece, and rollers interposed between all of said pieces.

16. In combination, a suspended structure which is free to gyrate, a shaft for driving same, a pin set eccentric to said shaft, and inclined way restraining means carrying the weight of the pin and the shaft and cooperating therewith to restrain abnormal throw of the structure.

17. In combination, a gyratory structure, a nongyratory driver therefor, a shaft mounted in said structure and operably connected to the driver, a pin set eccentric to said shaft, and inclined way restraining means operably connected to said eccentric pin for restraining abnormal throw of the structure.

18. In combination, a gyratory structure, a shaft mounted therein, a pin connected to said shaft, a fixedly-mounted driver surrounding the axis of movement, a yielding connection between said pin and said driver, and inclined way restraining means between the structure and the driver for restraining abnormal throw of the structure.

19. In combination, a suspended structure, a shaft mounted therein, a driver, inclined way restraining means operably connected to said structure and tending to restrain the same from abnormal throw, and a yielding coupling connecting the shaft and the driver.

20. In combination, a freely suspended structure, means for imparting a gyratory motion thereto, and a plural-piece restraining member consisting of a stationary bottom piece having two pairs of V-shaped ways, an intermediate piece having four pairs of V-shaped ways two pairs of which are arranged at right-angles to the remaining two pairs, a top piece connected to the structure and having two pairs of V-shaped ways arranged above the remaining two pairs of the intermediate piece, and antifriction rollers engaging the V-shaped ways on the upper side of the intermediate piece and the V-shaped ways on the lower side of the top piece.

21. In combination, a gyratory structure, a crank-shaft therefor, and restraining means consisting of a plurality of inclined ways one of which is stationary and another of which is operably connected to the crank-shaft.

22. In combination, a gyratory structure, a driver therefor having a wall, and a yielding-coupling within the wall whereby motion is imparted from the latter to the structure.

23. In combination, a gyratory structure, a driver therefor, a stationary support for said driver, and restraining means located between said structure and the driver consisting of a plurality of inclined ways, one of which is connected to the stationary support and another to the structure to tend to hold the latter from abnormal throw.

24. In combination, a structure, freely supported for gyration, a driver therefor, restraining means normally in axial alinement with the driver and tending to hold the structure in its true gyratory course, and means yieldingly-connecting the driver and the restraining means to the structure.

25. In combination, a structure freely supported for gyration, and restraining means operably connected to said structure consisting of a stationary bottom piece, a vertically and laterally movable intermediate piece superimposed upon the bottom piece, and a laterally and vertically movable top piece superimposed upon the intermediate piece.

26. In combination, a structure freely supported for gyration, and restraining means operably connected to said structure consisting of a stationary bottom piece having parallel inclined ways, a top piece capable of gyratory motion and provided with parallel inclined ways arranged at an angle to the inclined ways on the bottom piece, and an intermediate piece having two sets of parallel inclined ways which coöperate with the inclined ways on the top and bottom pieces and tend to restrain the structure from abnormal throw.

27. In combination, a structure freely supported for gyration, a driver therefor, restraining means normally in axial alinement with the driver and tending to hold the structure in its true gyratory course, a coupling yieldingly-connecting the driver and the restraining means to the structure, and a ball-bearing interposed between said coupling and the restraining means.

28. In combination, a structure freely supported for gyration, a driver therefor having a wall forming a lubricant-chamber, means located in the lubricant-chamber and tending to restrain abnormal throw of the structure, a coupling yieldingly-connecting the driver and the restraining means to the structure, and a lid independent of but cooperating with the coupling in closing the top of the lubricant-chamber.

29. In combination, a gyratory structure, a stationary support, and restraining means between the structure and said stationary support consisting of a plurality of superimposed inclined ways, a number of which are capable of moving in different directions to each other.

30. In combination, a gyratory structure, a shaft thereto, a stationary driver, a yielding coupling between the shaft and the driver, restraining means for restricting abnormal throw of the structure, and a common support for the driver and said restraining means.

31. In combination, a gyratory structure, a shaft thereto, means for imparting a gyratory motion to said structure, and restraining means operably-connected to said shaft, consisting of a plurality of noncircular inclined ways permanently arranged at an angle to each other.

In testimony whereof I affix my signature in the presence of two witnesses.

GEORGE W. COMBS.

Witnesses:
G. D. OBERSCHELP,
G. H. SHEIDENBERGER.

Copies of this patent may be obtained for five cents each, by addressing the "Commissioner of Patents, Washington, D. C."